V. J. KOEHLER.
COCK CONTROLLING DEVICE FOR AIR BRAKE SYSTEMS.
APPLICATION FILED AUG. 23, 1909.

952,121.

Patented Mar. 15, 1910.

WITNESSES

INVENTOR
Victor J. Koehler.
BY
Attorneys

UNITED STATES PATENT OFFICE.

VICTOR J. KOEHLER, OF PUNXSUTAWNEY, PENNSYLVANIA.

COCK-CONTROLLING DEVICE FOR AIR-BRAKE SYSTEMS.

952,121.

Specification of Letters Patent. Patented Mar. 15, 1910.

Application filed August 23, 1909. Serial No. 514,270.

*To all whom it may concern:*

Be it known that I, VICTOR J. KOEHLER, citizen of the United States, residing at Punxsutawney, in the county of Jefferson and State of Pennsylvania, have invented certain new and useful Improvements in Cock-Controlling Devices for Air-Brake Systems; and I do hereby declare the following to be a full, clear, and exact description of the invention, such as will enable others skilled in the art to which it appertains to make and use the same.

My invention relates to certain new and useful improvements in handles for stop cock valves, and is more particularly adapted for use on that type of angle cock valves used in air brake systems.

The particular object of my invention is the production of a combined handle and lock, provided with a casing for the protection of the valve stem and its connections against injury by weather conditions and accidental displacement and to produce a positive locking means in either an open or closed position of the valve.

In my device, two direct movements of the handle are required to effect the rotary movement of the valve stem. This arrangement provides against accidental movement of the valve, by which accidents have frequently happened, owing to the accidental stoppage of communication by reason of the train pipes being closed at some point between the engineer's brake valve and rear end of the train. This may be caused by some object coming in contact with the angle cock plug or stem whereby the spring tension in the angle cock body is relaxed, causing the accidental rotary movement of the angle cock plug or stem to a closed position and preventing the engineer from controlling the brakes in the rear of the closed angle cock.

A further feature of my invention lies in the fact that no change is required in the angle cock body now in use, when it is desired to use my invention in connection therewith, further than the removal of the handle now in use and the substitution of my locking device therefor, the said device being secured to the stem of the angle cock by a pin in the usual way.

In order that my invention may be clearly understood, I have illustrated it in the accompanying drawings, in which I have shown one form in which I have contemplated embodying my invention, and the said invention is fully disclosed in the following specification and claims, reference being had to the said drawings, in which similar reference letters refer to identical parts throughout.

Figure 1:
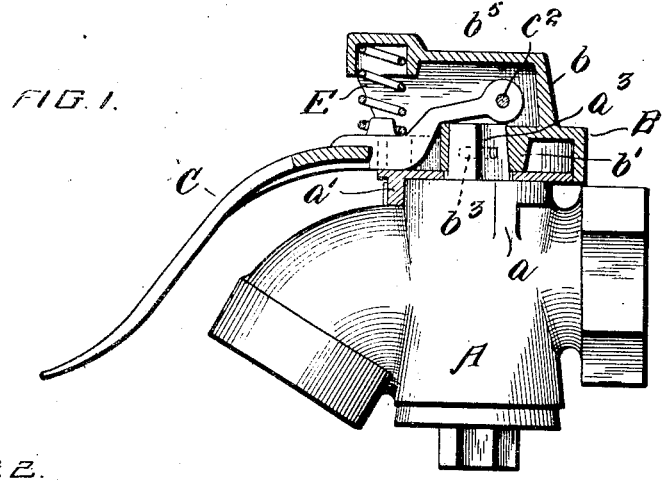
Figures 2, 5:
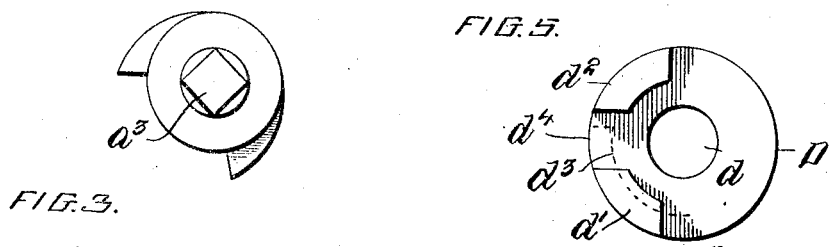
Figures 3, 6:
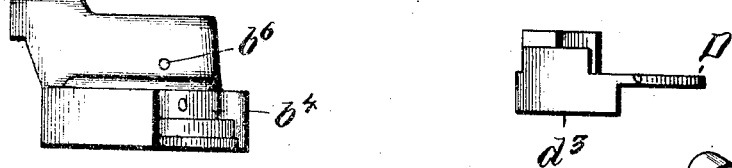
Figure 4:
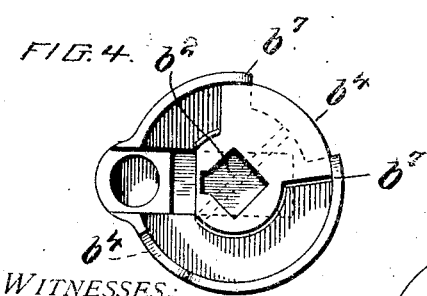
Figure 7:
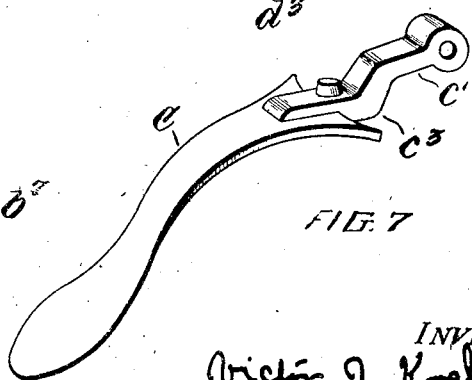

In the drawings, Figure 1 is a side elevation partly in section, of an angle cock designed particularly for use in an air brake system, and having my improved controller applied thereto. Fig. 2 is a top view of a portion of the angle cock body showing the position of the locking lugs. Fig. 3 is a side elevation of the casing forming part of the controller and fitted on the stem of the cock. Fig. 4 is a bottom plan view of said casing. Fig. 5 is a plan view of the upper face of the locking plate. Fig. 6 is a side view of the same. Fig. 7 is a perspective view of the controller lever or handle.

In the drawings A represents an angle cock of usual or preferred construction, adapted more especially for use in air brake systems, although I wish it understood that my invention is also applicable to other uses. The angle cock A is provided with locking shoulders $a$, $a'$ and the valve proper of said angle cock is provided with a valve stem $a^3$ for rotating the valve to open and close the same. The stem $a^3$ is preferably square in cross section, as shown.

B represents a valve stem casing comprising a cylindrical exterior wall forming part of my improved controller, having a closed top $b$ from the center of which projects downwardly a hollow boss $b'$ provided with a recess $b^2$ square in cross section and shaped to fit snugly over the similarly shaped valve stem $a^3$ to which it is secured by a pin $b^3$ passing through the boss and stem as shown. The casing B is provided on opposite sides of the exterior wall with recesses $b^4$ in line with the pin $b^3$ to facilitate the insertion and removal of the said pin. The casing B is also provided with a portion $b^5$ perforated at $b^6$ to receive a pivot pin to which the controller lever or handle is secured, and the casing is also provided with a main stop portion $b^7$ extending downwardly from the top of the casing, and partially surrounding the boss $b'$ for engaging one or the other of the shoulders $d'$, $d^2$ on the locking plate D, to limit the rotary movement of the valve.

C represents the controller lever or handle, which is provided with a portion adapted to be pivotally connected to the casing, and which is curved so as to form a portion $c'$ which will lie within the casing $b^5$ and extend over the valve stem $a^3$ and conform to the center boss $b'$ of the casing. A pin $c^2$ passes through the portion $b^5$ of the casing B and the lever and connects the lever pivotally to the casing. The lever C is also provided with a portion $c^3$ for engaging a recess $d^4$, $d^5$ of the locking plate D at the open or closed position of the valve, to lock said valve in the positions in which it is stopped by the said stop portion $b^7$ on the casing B.

D represents the locking plate or ring, having a central aperture $d$, to allow the plate to surround the valve stem $a^3$. This locking plate or ring is provided on its upper face with projecting upright portions or lugs $d'$, $d^2$, concentric with the main stop portion or lug $b^7$ of the casing B, and when the parts are assembled, the lugs $b^7$, $d'$, $d^2$ will form an interior wall substantially surrounding the boss $b'$. This locking plate or ring is also provided on its lower face with a depending locking portion or lug $d^3$ to engage the locking shoulders $a$, $a'$ of the angle cock body. The lugs $d'$, $d^2$ are so arranged on the locking plate as to form recesses for engaging the locking portion $c^3$, of the handle as at $d^4$, $d^5$ to hold or lock the valve in its open or closed positions.

E represents a spring for holding the vertically movable locking handle normally in its lowest position, said spring having its ends bearing against the top side of the handle C and the underside of the top of the casing $b^5$.

The operation of the device is apparent. In the position shown in Fig. 1, the locking portion $d^3$ on the locking plate D is in engagement with the lugs or shoulders $a$, $a'$ of the cock body and the portion $c^3$ of the lever or handle C is in the recess $d^4$ of the locking plate D, at the open position of the valve, thus locking the valve of the cock firmly in that position. When it is desired to change the position of the angle cock valve, the outer end of the lever is raised against the pressure of the spring E until the portion $c^3$ of said lever is clear of the shoulder $d'$ of the locking plate D when the lever can be moved laterally with the casing B to rotate the valve stem until the stop portion $b^7$ on the casing B engages the other shoulder $d^2$ of the locking plate, when the portion $c^3$ of the handle or lever will engage the lug $d'$ as at $d^5$ of the locking plate, being forced and retained there by the spring E, when the outer end of the handle is released, thus preventing the return movement of the lever. By this arrangement it is obvious that the valve of the angle cock may be held locked in either open or closed position.

What I claim and desire to secure by Letters Patent is:—

1. In a cock controlling device, the combination with a relatively stationary member adapted to be attached to the valve casing, of a member adapted to be attached to the valve stem and to move therewith, said movable member having a limited movement, and an operating handle pivotally secured to said movable member, said handle being movable laterally to operate the valve and vertically to engage portions of said stationary member to lock the valve against movement.

2. In a cock controlling device, the combination with a relatively stationary member adapted to be secured to the valve casing, of a member adapted to be secured to the valve stem and to move therewith, coöperating lugs on said members for limiting the movement of the valve, and an operating handle pivotally secured to said movable member, said handle being movable laterally to operate the valve and spring pressed vertically to lock the valve.

3. In a cock controlling device, the combination with a plate adapted to rest upon the top of the valve casing and having an aperture therein to permit the valve stem to project therethrough, coöperating lugs on said plate and the valve casing for maintaining said plate stationary, a member adapted to be secured to the valve stem and to move therewith, coöperating lugs on said member and said plate to limit the movement of the valve and an operating handle pivotally secured to said member, said handle being movable laterally to operate the valve and spring pressed vertically to lock the valve.

4. In a cock controlling device, the combination with a plate adapted to rest upon the top of the valve casing and having an aperture therein to permit the valve stem to project therethrough, coöperating lugs on said plate and the valve casing for maintaining said plate stationary, a casing member adapted to be secured to the valve stem and to move therewith, coöperating lugs on said member and said plate to limit the movement of the valve and an operating handle pivotally secured to said member, said handle being movable laterally to operate the valve and spring pressed vertically into recesses in said plate to positively lock the valve in either open or closed position.

5. In a cock controlling device, the combination with a plate adapted to rest upon the top of the valve casing and having an aperture therein for receiving the valve stem, said plate having a portion for engaging lugs on the valve casing to maintain the same stationary, a casing inclosing said plate and having a centrally disposed boss arranged to fit onto the valve stem, a member carried within said casing and arranged to coöperate with lugs on said plate to limit the movement of the valve, an operating handle pivotally secured within said casing, said handle being movable laterally to operate said casing and the valve, and a spring within said casing tending to move said handle vertically into engagement with portions of said plate to lock the valve against movement.

6. In a cock controlling device, the combination with a casing having a centrally disposed boss adapted to be rigidly secured to a valve stem, an operating handle pivotally connected within said casing, a relatively stationary locking member adapted to rest upon the top of the valve casing and provided with locking projections, said projections being so arranged as to form recesses for engaging the locking portion of the handle at the open or closed position of the valve, a spring within said casing tending to move said handle vertically into the recesses to positively lock the valve against movement.

7. In a cock controlling device, the combination with a part adapted to be rigidly secured to a valve stem, a locking ring adapted to lie upon the top of the valve casing and having portions projecting upright therefrom forming part of an interior wall tending to surround the part to be rigidly secured to the valve stem, said locking ring being provided on its under side with a locking projection for engaging projecting stops on the valve body, a valve stem casing, an operating handle pivotally connected thereto, means whereby the operation of the handle will adjust said casing to an operative or an inoperative position, the casing comprising a boss and a partial interior and an exterior wall surrounding the boss to protect the valve stem, a portion of the handle and its connections, said interior and exterior walls being provided with apertures or recesses to facilitate the insertion and removal of the connecting means for securing the boss to the valve stem.

In testimony whereof I affix my signature, in the presence of two witnesses.

VICTOR J. KOEHLER.

Witnesses:
  HARRY M. KANARR,
  MAURICE L. COULTER.